United States Patent
Staats et al.

(10) Patent No.: US 11,518,354 B2
(45) Date of Patent: Dec. 6, 2022

(54) WEIGHT PROFILE DETERMINATION SYSTEM

(71) Applicant: Westinghouse Air Brake Technologies Corporation, Wilmerding, PA (US)

(72) Inventors: Andrew Ryan Staats, Cedar Rapids, IA (US); Stuart J. Barr, Cedar Rapids, IA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 481 days.

(21) Appl. No.: 16/695,914

(22) Filed: Nov. 26, 2019

(65) Prior Publication Data

US 2021/0155210 A1 May 27, 2021

(51) Int. Cl.
| | | |
|---|---|---|
| *B60T 7/12* | (2006.01) | |
| *B60T 8/17* | (2006.01) | |
| *B60T 17/22* | (2006.01) | |
| *B60T 13/66* | (2006.01) | |
| *B60L 3/10* | (2006.01) | |
| *B60T 8/32* | (2006.01) | |
| *B60T 8/18* | (2006.01) | |
| *B60T 8/172* | (2006.01) | |

(52) U.S. Cl.
CPC .............. *B60T 8/1705* (2013.01); *B60L 3/10* (2013.01); *B60T 8/172* (2013.01); *B60T 8/1893* (2013.01); *B60T 8/3235* (2013.01); *B60T 13/665* (2013.01); *B60T 17/228* (2013.01); *B60L 2200/26* (2013.01)

(58) Field of Classification Search
CPC ...... B60T 8/1705; B60T 8/172; B60T 8/1893; B60T 8/3235; B60T 13/665; B60T 17/228; B60T 7/18; B60T 8/18; B60T 2250/02; B60T 8/171; B60T 7/12; B60L 3/10; B60L 2200/26; B60L 15/32; B60L 15/40; B60L 2240/12; B60L 2240/16; B60L 2240/26; B60L 15/2009; Y02T 10/72; Y02T 90/16
USPC .......................................................... 701/71
See application file for complete search history.

(56) References Cited

U.S. PATENT DOCUMENTS

| | | | | |
|---|---|---|---|---|
| 6,459,050 | B1* | 10/2002 | Muhs ................... | G01G 19/022 177/133 |
| 2018/0366005 | A1* | 12/2018 | Seenumani ......... | B61L 15/0018 |
| 2020/0216001 | A1* | 7/2020 | Chauncey ............. | B60W 50/14 |

* cited by examiner

*Primary Examiner* — Shardul D Patel

(74) *Attorney, Agent, or Firm* — Christopher R. Carroll; The Small Patent Law Group LLC

(57) ABSTRACT

A weight profile determination system includes a sensor and a controller. The sensor is disposed along a route and configured to generate a plurality of force measurements of a vehicle system moving on the route relative to the sensor. The force measurements are obtained at different times and correspond to different locations along a length of the vehicle system. The controller is configured to determine a weight profile for the vehicle system based on the force measurements generated by the sensor. The weight profile represents a distribution of weight along the length of the vehicle system. The controller is configured to communicate the weight profile to one or more of the vehicle system or an offboard device for controlling movement of the vehicle system based on the weight profile.

20 Claims, 3 Drawing Sheets

WEIGHT PROFILE DETERMINATION SYSTEM

BACKGROUND

Technical Field

The subject matter described herein relates to measuring characteristics of a vehicle system.

Discussion of Art

The weight of a vehicle system traveling on a route affects various movement characteristics of the vehicle system. For example, weight affects acceleration capabilities, braking distances, friction properties, lateral forces (e.g., centrifugal forces) along curves, and the like. Various algorithms for modeling the movement of vehicle systems rely on weight and/or mass information of the vehicle systems as input parameters in physics-based calculations.

The accuracy of movement modeling algorithms is reduced when inaccurate vehicle weight and/or mass information are used in the calculations. For example, some systems may retrieve and utilize predefined, generic weight values from a database to represent the weight of the vehicle system in the calculations. The weight values selected may be based on type of vehicle (e.g., coal car, flatbed car, locomotive, etc.), regardless of whether the vehicle is loaded with cargo, the type of the cargo if loaded, and the like. The actual weight of the vehicle system may vary considerably from the weight that is determined based on the selection of generic, predefined weight values. This considerable variance between the expected and actual weight reduces the accuracy of the modeling of vehicle movement. For example, due to the variance, the movement modeling algorithms often make conservative estimates to error on the side of caution, such as by overestimating a distance required to bring the moving vehicle system to a stop and underestimating acceleration capabilities of the vehicle system. As a result, a vehicle system moving according to the conservative estimates may operate at reduced performance levels (e.g., fuel efficiency, speed, acceleration settings, brake settings, or the like) than the vehicle system would operate if the movement were more accurately modeled.

BRIEF DESCRIPTION

In one embodiment, a system (e.g., a weight profile determination system) is provided that includes a sensor and a controller. The sensor is disposed along a route and configured to generate a plurality of force measurements of a vehicle system moving on the route relative to the sensor. The force measurements are obtained at different times and correspond to different locations along a length of the vehicle system. The controller is configured to determine a weight profile for the vehicle system based on the force measurements generated by the sensor. The weight profile represents a distribution of weight along the length of the vehicle system. The controller is configured to communicate the weight profile to one or more of the vehicle system or an offboard device for controlling movement of the vehicle system based on the weight profile.

In one embodiment, a method (e.g., for determining a weight profile of a vehicle system) includes generating a plurality of force measurements of a vehicle system moving on a route. The force measurements are obtained at different times and correspond to different locations along a length of the vehicle system. The method includes determining a weight profile for the vehicle system based on the force measurements that are generated. The weight profile represents a distribution of weight along the length of the vehicle system. The method also includes communicating the weight profile to one or more of the vehicle system or an offboard device for controlling movement of the vehicle system based on the weight profile.

In one embodiment, a system (e.g., a weight profile determination system) includes a sensor, a controller, and a vehicle control system. The sensor is disposed along a route and configured to generate a plurality of force measurements of a vehicle system moving on the route relative to the sensor. The force measurements are obtained at different times and correspond to different locations along a length of the vehicle system. The controller is configured to determine a weight profile for the vehicle system based on the force measurements generated by the sensor. The weight profile represents a distribution of weight along the length of the vehicle system. The vehicle control system is onboard the vehicle system and is configured to receive the weight profile determined by the controller and to use the weight profile to determine movement characteristics of the vehicle system including one or more of brake characteristics, acceleration characteristics, or friction characteristics.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to systems and methods that utilize force measurements of a moving vehicle system to determine a weight profile for the vehicle system that can be used to refine consist parameters and movement characteristics of the vehicle system. At least one technical effect of the embodiments described herein includes controlling movement of a vehicle system based on a measured weight profile of that vehicle system. For example, the movement may be controlled according to movement characteristics, such as braking distances, acceleration capabilities, wheel slippage, lateral forces along curves, that are calculated based on the measured weight profile, and the movement characteristics based on the weight profile may more accurately model the actual movement behavior of the vehicle system on the route than using predefined weight values. Another technical effect may include determining the weight profile of the vehicle system while the vehicle system moves along a route without hindering or interfering with the movement of the vehicle system along the route. Yet another technical effect can include validating and/or refining predefined weight values associated with individual vehicles based on the measured weights of specific vehicles.

The systems and methods described herein can be used with rail vehicle systems (e.g., trains). The rail vehicle systems can be equipped with an onboard control system that can automatically apply brakes to slow or stop movement of the vehicle system. One or more embodiments of the weight profile determination system described herein can be used in connection with other types of vehicles, such as automobiles, trucks, buses, mining vehicles, marine vessels, aircraft, agricultural vehicles, or the like. For example, a weight profile of a road train or convoy of trucks traveling together along a highway can be determined and used for modeling and controlling the movement of the road train.

Figure 1:
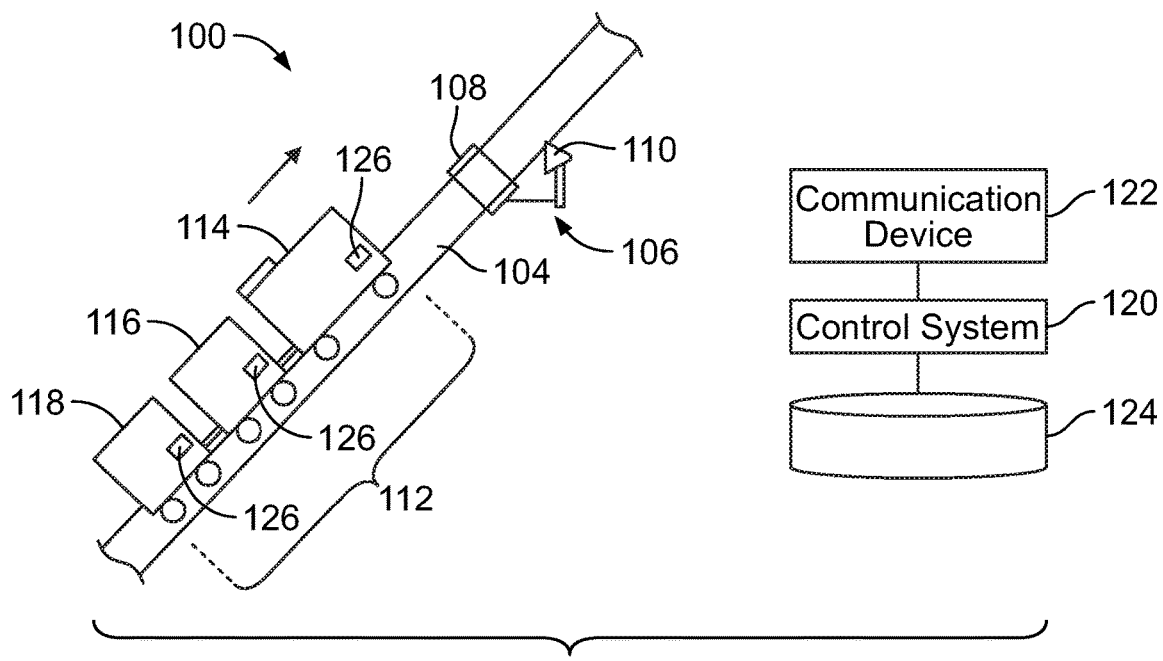
FIG. 1 illustrates one example of a weight profile determination system.

FIG. 1 illustrates one example of a weight profile determination system 100. The weight profile determination system can be disposed along one or more routes 104. The route can be a track (e.g., railroad track), road (e.g., paved or unpaved), or the like, on which ground-based vehicles travel. The weight profile determination system includes a wayside component assembly 106 configured to generate weight profiles based on force measurements of vehicle systems moving along the route. The weight profile determination system may include a control system onboard a vehicle system traveling on the route and/or an off-board control system at a centralized location. The onboard vehicle control system and/or off-board control system can communicate with the wayside component assembly to receive the weight profile and control movement of the vehicle system based on the weight profile. The wayside component assembly (also referred to herein as wayside assembly) can be stationary such that the wayside assembly does not move while the vehicle systems moving on the route pass by the wayside assembly. The wayside assembly includes a sensor 108 disposed along the route and a controller 110 operably connected to the sensor. The wayside assembly according to various embodiments described herein may include additional components such as a camera, an optical reader device, and/or the like.

Optionally, the wayside component assembly can be mobile such that the wayside component assembly can move from one location along the route to another location along the same route or a different route as needed. For example, the wayside component assembly can include wheels, a continuous track, or movable legs for traversing along the ground, or can include rotors or other aerial lift devices for flying from one location to another location.

The sensor can generate and output data signals indicative of one or more size characteristics of a vehicle system 112 along the route as the vehicle system moves past the sensor. The sensor can be a force sensor that generates a plurality of discrete force measurements over time. Each force measurement may represent an instantaneous perceived weight of a respective segment of the vehicle system. In one or more embodiments, the vehicle system is longer than the sensor, so the instantaneous weight measured at a given measurement interval does not represent the entire weight of the vehicle system.

The vehicle system can have various segments. The segments may be different discrete vehicles that collectively represent the vehicle system, different axles, different trailers, different portions of a continuous elongated structure, or the like. In a non-limiting embodiment, the vehicle system can be a rail-based train that includes a plurality of individual rail vehicles coupled together. The rail vehicles can include propulsion vehicles such as locomotives and non-propulsion vehicles such as cargo cars and passenger cars. The illustrated vehicle system in FIG. 1 is a train that includes one propulsion vehicle 114 that pulls two non-propulsion vehicles 116, 118. Although three vehicles are shown in FIG. 1, the vehicle system may have any number of discrete vehicles, such as dozens or even hundreds of vehicles depending on various application-specific uses. In another non-limiting embodiment, the vehicle system includes multiple vehicles that are communicatively connected together but are not physically coupled, such that the vehicles in the vehicle system are mechanically separate from each other. The vehicles communicate with each other to travel with coordinated movements along the route to maintain designated separation distances between the vehicles. The mechanically separate vehicles that make up the vehicle system can be road vehicles such as semi-trucks, buses, and the like, or off-road vehicles such as mining trucks, agricultural vehicles, and the like.

The sensor is disposed on, in, or underneath the route, and the sensor experiences forces exerted by the vehicle system on the route as the vehicle system traverses the location of the sensor. The sensor can be any force sensor or transducer, such as a weight scale, a piezoelectric sensor, a pressure sensor, a load cell (e.g., a strain gauge), or the like. The sensor includes internal elements and circuitry to convert mechanical energy (e.g., pressure) into electrical energy. The sensor may have a pad, a housing, a protective coating, and/or the like to protect the internal elements and circuitry from the applied forces, contaminants, moisture, and the like.

In one or more embodiments, the sensor generates the force measurements as the vehicle system moves along the route without hindering or otherwise interfering with the movement of the vehicle system. For example, the vehicle system does not need to pass the sensor at a specific speed or range of speeds to enable the wayside assembly to generate a weight profile of the vehicle system. The sensor can generate force measurements at a frequency that is sufficiently short (e.g., quick) to achieve multiple measurements for each of the segments of the vehicle system. In a non-limiting example, as the vehicle system shown in FIG. 1 passes the sensor traveling at a first speed, the sensor may generate 30 measurements during the time period that the first vehicle 114 drives over the sensor and may generate 20 measurements during each of the respective time periods that the second and third vehicles 116, 118 drive over the sensor. Even if the vehicle system travels at twice the speed without modifying the measurement frequency of the sensor, the sensor would still be able to generate about 15 measurements corresponding to the first vehicle and about 10 measurements for each of the second and third vehicles. The specific frequency of measurements of the sensor can depend on hardware-specific and/or application-specific considerations. Optionally, the sensor may be configured to alter the measurement frequency based on control signals received from the controller of the wayside assembly. The systems and methods described herein can be performed at any measurement frequency of the sensor and at any speed of the vehicle system relative to the sensor. In general, higher measurement frequencies correspond to greater accuracy of the weight profile relative to the actual weight distribution of the vehicle system, as the graphed data points more closely resemble a continuous plot line than a segmented plot line.

The wayside assembly can utilize one or more force thresholds for detecting the presence of a vehicle system and/or differentiating between different types of vehicle systems and other objects on the route. The wayside assembly may ignore force measurements below a given threshold to filter out objects, such as people and animals, on the route. Furthermore, if the wayside assembly is configured to generate weight profiles for rail vehicles (e.g., trains), then a threshold force may be set at a value that is below the forces exerted by rail vehicles but greater than forces exerted by some other types of vehicles, such as personal automobiles (e.g., cars, sport utility vehicles, pickup trucks, etc.). The controller of the wayside assembly may ignore force measurements of the sensor that are below the threshold. Upon receiving a force measurement at or greater than the threshold, the controller detects the presence of a vehicle system passing the sensor.

The wayside assembly may include a clock device for associating the force measurements with the time at which the measurements are generated. The clock device may be included within the hardware elements of the controller. Upon detecting the presence of the vehicle system, the controller can associate the force measurements with the times of the clock device. The controller can then store the force measurements and times in a local memory device. Based on the use of the force threshold and the clock device, the controller can determine when the measured forces cross the threshold. The force measurement initially exceeds the threshold at the time that a front end of a vehicle system passes the sensor, and the force measurement falls below the threshold at the time at which a rear end of the vehicle system passes the sensor. Based on this information, the controller can determine the time period during which a vehicle system traverses the sensor.

Figure 2:
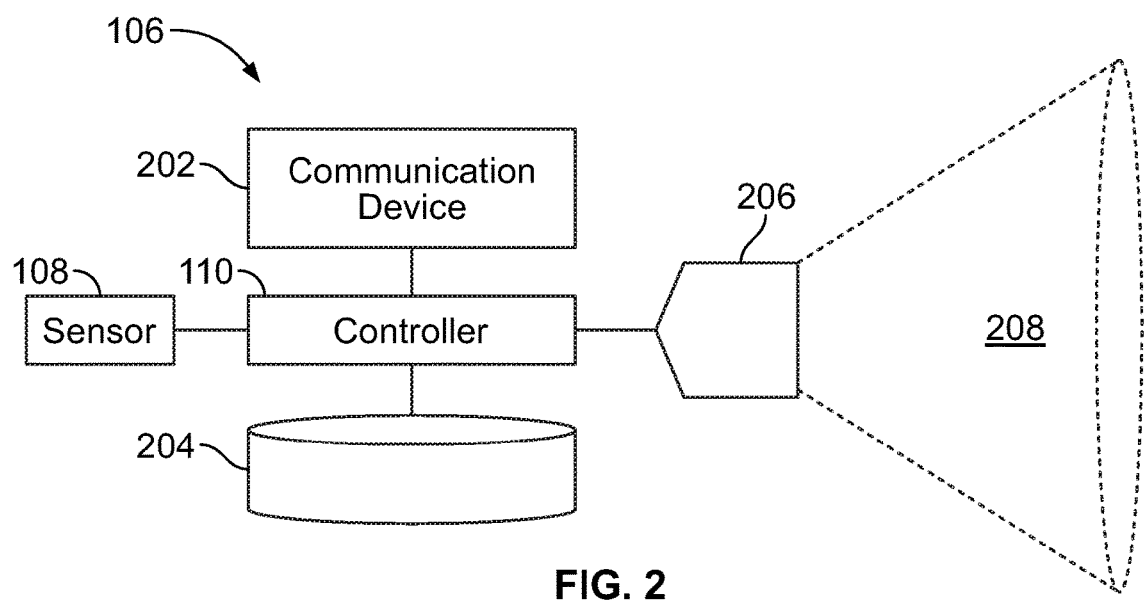
FIG. 2 illustrates one example of a wayside component assembly of the weight profile determination system shown in FIG. 1.

With continued reference to the weight profile determination system shown in FIG. 1, FIG. 2 illustrates one example of the wayside component assembly shown in FIG. 1. The wayside component assembly can include the sensor 108 that generates force measurements, the controller 110, a communication device 202, and a tangible and non-transitory computer-readable storage medium (e.g., memory) 204. Optionally, the wayside component assembly also includes at least one additional sensor 206 that monitors an area of the route. The controller represents hardware circuitry that includes and/or is connected with one or more processors (e.g., one or more microprocessors, integrated circuits, microcontrollers, field programmable gate arrays, etc.) that perform operations described in connection with the wayside assembly. The controller is operably connected to the sensor (e.g., the force sensor 108) via a wired or wireless communication pathway. The controller can receive the force measurements and examine the force measurements to determine a weight profile for the vehicle system.

Figure 3:
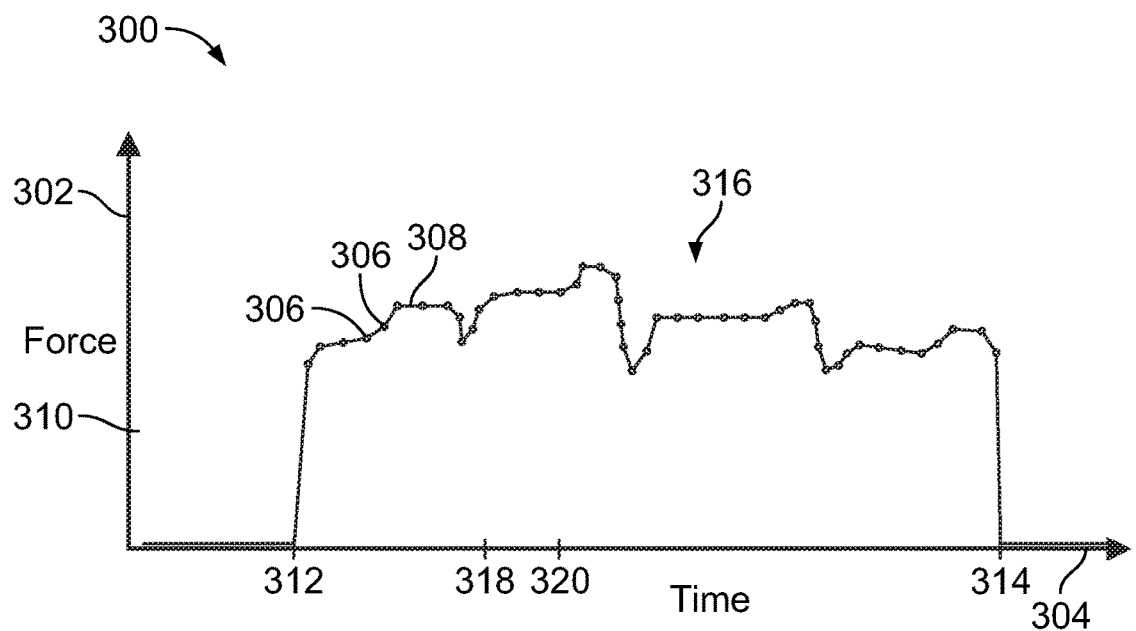
FIG. 3 is a graph plotting force measurements generated by a sensor of the wayside component assembly over time.

With continued reference to FIGS. 1 and 2, FIG. 3 is a graph 300 plotting force measurements generated by the sensor of the wayside component assembly over time. The vertical axis 302 represents force, and the horizontal axis 304 represents time. The graph includes points or dots 306 that represent the individual force measurements generated by the sensor at different times and a plot line 308 that connects the adjacent points. The points represent the force measurements at different locations along the length of the vehicle system because the vehicle system moves relative to the stationary sensor. The force can be measured in any unit of force, such as Newtons, pounds, or the like. Each force measurement can represent an instantaneous weight of a segment of the vehicle system as the vehicle system traverses the force sensor.

In the illustrated graph, the measured force exceeds a designated force threshold 310 at time 312, which indicates that a vehicle system has reached the force sensor along the route. The measured force remains above the threshold until time 314, which indicates that the vehicle system has passed beyond the force sensor. For example, at time 314, the rear end of the vehicle system traverses beyond the force sensor, so the force applied on the sensor by the weight of the vehicle system drops below the threshold. The measured force may vary along the length of the vehicle system (e.g., between times 312 and 314) as the vehicle system traverses the sensor because some segments of the vehicle system may be heavier than other segments. The measured force of a vehicle system defined by multiple vehicles can vary due to some vehicles being heavier than other vehicles, some loads (e.g., cargo, passengers, equipment, etc.) carried by the vehicles can be heavier than other loads, and the like. For example, a locomotive may be heavier than an unloaded cargo rail car due to a larger size and/or the presence of propulsion-generating machinery. Furthermore, the measured force may vary even along the lengths of individual vehicle based on an uneven distribution of weight along the lengths of the vehicles (e.g., the front of a passenger vehicle that includes the engine can be heavier than a rear trunk section and/or a passenger compartment).

The controller of the wayside component assembly aggregates the measurements generated by the force sensor to produce a force profile 316 for the vehicle system. The force profile is a distribution of force, applied by the vehicle system, along the length of the vehicle system. The force profile can represent a parameter of the vehicle system, such as weight, mass, or the like. The force profile is referred to herein as a weight profile 316 and represents a distribution of weight along the length of the vehicle system. The controller can store the weight profile in the memory of the wayside assembly.

In an embodiment, the controller can determine a total weight of the vehicle system based on the weight profile. For example, the area under the plot line 308 in the illustrated graph (between times 312 and 314) represents the total weight of the vehicle system. The area under the curve can be calculated using known mathematical equations. The controller may store the total weight value that is calculated in the memory.

The controller can also determine the weight of different individual segments of the vehicle system based on the weight profile. For a vehicle system that includes a plurality of discrete vehicles, the controller can analyze the weight profile in combination with additional information about the vehicle system to calculate the portion of the total weight attributable to one or more of the individual vehicles. The additional information about the vehicle system can include the total length of the vehicle system, a speed of the vehicle system as the vehicle system passes the force sensor, a vehicle make-up or arrangement of vehicles in the vehicle system, lengths of the individual vehicles, and/or the like. For example, if the position of a particular vehicle is known relative to the front of the vehicle system and either the speed of the vehicle system or the total length of the vehicle system is known, then the controller can calculate which force measurements generated by the sensor correspond to the particular vehicle. The formula distance equals speed over time, or variations thereof, can be utilized. In a non-limiting example, the controller may calculate, based on the weight profile and the additional information, that the particular vehicle traveled across the sensor between the times 318 and 320 in FIG. 3, so the force measurements during that time period are attributable to the particular vehicle. The controller can calculate the weight of the particular vehicle, individually, based on the area under the plot line during that time period. Optionally, the controller can utilize the weight profile to calculate an approximate weight for each of the vehicles in the vehicle system. The controller may store the weight values for the individual vehicles of the vehicle system in the memory. For example, the controller can direct the memory to electronically and/or magnetically store the weight profile, the total weight of the vehicle system that is calculated, the weights of individual vehicles that are calculated, and additional information about the vehicle system, at least temporarily to maintain a record.

The communication device of the wayside component assembly can be used to communicate information to another location, such as to the vehicle system and/or to a centralized off-board device, such as a back-office server. The information that can be communicated by the communication device includes the weight profile, calculated weight values of the vehicle system and any individual segments or vehicles thereof, and additional information about the vehicle system. The communication device can represent circuitry that can communicate data signals wirelessly and/or via wired connections. For example, the communication device can represent transceiving circuitry, one or more antennas, modems, or the like, that communicate (e.g., broadcast and/or transmit) a notification message via electrical signals. The notification message indicates the weight profile, calculated weights, and/or the like.

In an embodiment, the controller of the wayside component assembly can identify the vehicle system traversing past the force sensor for associating or linking the information in the notification message with the particular vehicle system. For example, multiple vehicle systems can travel along the route past the wayside component assembly over time, so associating the weight profile with the vehicle system allows for distinguishing a first weight profile of a first vehicle system from a second weight profile of a second vehicle system that passes the wayside assembly at a different time.

In a non-limiting example, the vehicle system can be identified by the wayside assembly receiving a unique identifier of the vehicle system. The vehicle system may communicate an identification message to the wayside assembly upon approaching the wayside assembly. The communication device of the wayside assembly receives the identification message and the controller analyzes the identification message to determine the unique identifier of the vehicle system. If an identification message is received within a threshold time period of the force sensor detecting the presence of a vehicle system traversing the route, then the controller associates or links the weight profile that is subsequently determined with the unique identifier provided in the identification message. The controller may store the unique identifier in the memory with the weight profile, calculated weights, and other associated information about the vehicle system. The unique identifier can be included in the notification message that is communicated from the wayside assembly to the vehicle system and/or the off-board centralized location.

In another embodiment, the vehicle system can be identified by the wayside assembly actively detecting a unique identifier 126 (shown in FIG. 1) of the vehicle system using the optical sensor 206 that monitors the route. For example, the optical sensor can be a camera that outputs static images and/or videos within a field of view 208 of the camera. The controller can receive the image data generated by the camera and examine the image data to determine an identity of the vehicle system. For example, the camera may be positioned to capture one or more identifiers that are disposed along outer surfaces of the vehicle system. The identifiers may be automated equipment identification (AEI) tags, vehicle serial numbers, company names, or the like. The controller may analyze the image data to detect the identifiers and link the identifiers with the weight profile. In another example, the optical sensor can be a reader device that scans for computer-readable codes, such as RFID tags, bar codes, and the like.

In a non-limiting embodiment, the image data or other data generated by the optical sensor can be utilized by the controller of the wayside component assembly to calculate the respective weight of a particular vehicle in the vehicle system, as described above. For example, the controller may be able to count the vehicles using the image data. The camera may be incorporated with a clock device such that the controller can determine the time period during which a particular vehicle crosses the force sensor based on the image data. Then, the controller can analyze the portion of the weight profile during that time period to calculate the weight attributable to the particular vehicle.

The notification message sent by the communication device of the wayside component assembly can be communicated to a centralized off-board device, such as a back-office server or system represented by a control system 120 in FIG. 1. The control system is off-board the vehicle systems traveling on the route. This control system can be referred to as a vehicle management control system or an off-board control system. The off-board control system can be separate and remote from the wayside component assembly so that the off-board control system can receive notification messages from multiple wayside component assemblies at different locations along one or more routes. The off-board control system can represent hardware circuitry that includes and/or is connected with one or more processors that perform the operations of the off-board control system. The off-board control system can include or be connected with a communication device 122 that can include some or all of the same components of the communication device of the wayside component assembly to communicate with the wayside component assembly.

The off-board control system can be or include a back-office server of a positive control system in one embodiment. Alternatively, the off-board control system can be another system that monitors movements of the vehicles to ensure safe travel of the vehicles. For example, the off-board control system can be a dispatch facility, a scheduling facility, or the like. The off-board control system can include a tangible and non-transitory computer-readable storage medium (e.g., a memory) 124 that stores locations of various vehicle systems, locations of one or more wayside component assemblies, and/or information from the notification messages, such as weight profiles, calculated weights based on the weight profiles, vehicle identifiers, and/or other vehicle information (e.g., length, speed, make-up or arrangement of vehicles, and the like).

Figure 4:
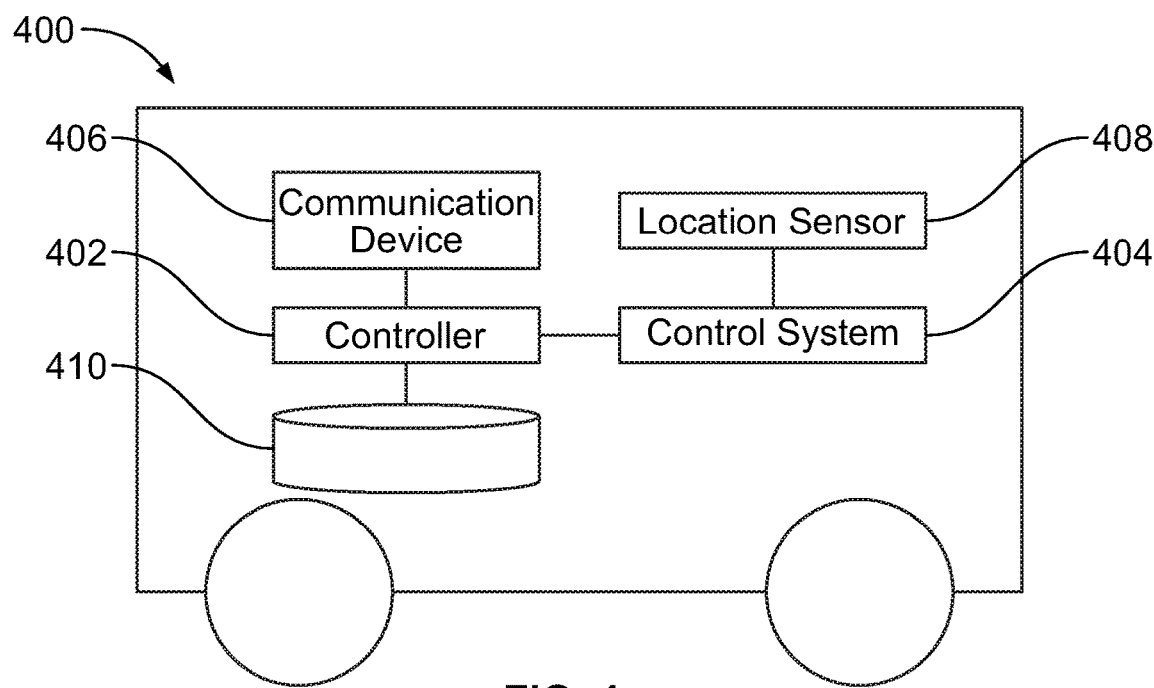
FIG. 4 illustrates one example of a vehicle shown in FIG. 1.

FIG. 4 illustrates one example of a vehicle 400. The vehicle shown in FIG. 4 can represent the vehicle 114 of the vehicle system 112 shown in FIG. 1. The vehicle is shown as a land-based vehicle, such as a rail vehicle (e.g., locomotive), but optionally can be another type of land-based vehicle or may be a vehicle that travels via waterways and/or the air. The vehicle includes a vehicle controller 402 that represents one or more processors that control movement and other operations of the vehicle. The vehicle controller can represent an engine control unit, an onboard navigation system, or the like, that can control a propulsion system (e.g., one or more engines, motors, etc.) and/or a braking system (e.g., one or more friction brakes, air brakes, regenerative brakes, etc.) to control movement of the vehicle.

The vehicle optionally includes an onboard control system 404 that communicates with the off-board control system for limiting where and/or when the vehicle can move. For example, the onboard control system can automatically apply brakes of the vehicle to slow or stop the vehicle based on warning bulletins received from the off-board control system. In one embodiment, the onboard control system is an onboard component of a positive control system that limits where and when the vehicle can move based on movement authorities, locations of other vehicles, or the like. For example, the positive control system may require receipt of a permission signal from an off-board source, such as the off-board control system, prior to releasing the brakes of the vehicle system or otherwise allowing movement of the vehicle system along the route. The default action is to remain stationary until a permission signal is received. In another embodiment, the onboard control system can be an onboard component of a different type of positive control system, a negative control system, a manual control system, or the like. In a negative control system, the vehicle system as a default is allowed to move and the vehicle system is only restricted from moving in response to receiving a signal prohibiting movement.

The notification message from the wayside assembly can be received by the vehicle controller and/or onboard control system via a communication device 406. This communication device can include an antenna and wireless transceiving circuitry that wirelessly communicates signals with other communication devices described herein. A tangible and non-transitory computer-readable storage medium (e.g., a memory) 410 of the vehicle may store locations and/or layouts of the routes, locations of the monitored areas, identities of the camera assemblies and the monitored areas examined by the camera assemblies, etc.

As described above, the wayside component assembly can communicate a notification message to the vehicle 400 and/or the off-board control system 120. The notification message includes the weight profile associated with a vehicle system. The notification message may also include calculated weights (e.g., a total weight of the vehicle system and/or individual weights of one or more vehicles of the vehicle system), an identification of the vehicle system, and/or additional information. The additional information can include a location of the wayside assembly, a time during which the vehicle system passed the wayside assembly, a speed of the vehicle system, a length of the vehicle system, and/or the like.

In an embodiment, the weight profile is used by the onboard vehicle control system and/or the off-board control system for controlling movement of the vehicle system. For example, the weight profile and/or weights calculated based on the weight profile can be input into algorithms for modeling or simulating the movement of the vehicle system along the route. The weight profile may be used to determine weight-dependent movement characteristics of the vehicle system, such as brake characteristics, acceleration characteristics, friction characteristics, lateral forces around curves, and/or the like. The weight of a vehicle system affects the momentum and inertia of the moving vehicle system. The brake characteristics may refer to stopping distances or more generally to a calculated distance and/or braking effort required before the vehicle system achieves a desired speed (zero or non-zero). The acceleration characteristics may refer to acceleration capabilities of the vehicle system, such as a calculated amount of time and/or tractive effort required to enable the vehicle system to achieve a desired speed (e.g., a zero-to-sixty miles per hour time). The friction characteristics can refer to wheel slippage of the vehicle system relative to the route and other traction-based considerations. The lateral forces can refer to centrifugal acceleration of a vehicle system when traveling along a curve. The lateral forces can cause the vehicle system to tilt or lean, which can undesirably increase wheel wearing, cause passengers and/or cargo to move, and/or at worst cause the vehicle system to derail and/or topple over.

By utilizing the weight profile in algorithms and calculations that depend on weight values to model or simulate the movement characteristics of the vehicle system, the simulated movement may be more accurate that using a generic weight value. For example, the weight profile is generated based on actual measurements of the vehicle system and accounts for a distribution of the weight along the length of the vehicle system, so the weight profile is more accurate than a generic weight value that is not specific to the vehicle system.

In a non-limiting example, the vehicle controller of the vehicle shown in FIG. 4 can perform a brake distance calculation using, as an input variable, the total weight of the vehicle system calculated based on the weight profile. Because the total weight value is more accurate than using a generic weight, the vehicle controller has more confidence in the output distance that is determined to stop the vehicle system. As a result, the vehicle controller can apply a reduced safety offset when controlling the movement of the vehicle system. For example, if the determined stopping distance is 1000 meters (m), the vehicle controller may use a 100 m safety offset and start applying the brakes at 1100 m from a target stopping location. A more conservative 250 m safety offset would be applied if the confidence is lower, such as if a generic weight is used in the brake distance calculation, which would result in the vehicle controller applying the brakes earlier. The performance of the vehicle system, such as fuel efficiency, duration of trip, and the like, can be improved by delaying the application of the brakes. The use of the weight profile can result in increased accuracy of modeled or simulated vehicle movement, which allows for improved performance of the vehicle system by being less conservative with the control of the vehicle system along the route.

The simulated vehicle movement may be incorporated into a movement plan that is generated by the onboard control system 404 in FIG. 4 or the off-board control system 120 in FIG. 1. The movement plan may designate tractive settings and/or brake settings that are based on the location of the vehicle system along the route during a trip of the vehicle system. The movement plan, if generated off-board, can be communicated by the off-board communication device 122 (shown in FIG. 1) to the vehicle system. Upon receipt of the movement plan, the vehicle controller can control the movement of the vehicle system based on the movement plan. For example, the vehicle controller can generate control signals for controlling operations of the vehicle propulsion system based on the tractive and brake settings designated in the movement plan. The vehicle can include a location sensor 408 that determines the location of the vehicle system over time. The location sensor can represent a global positioning system receiver, a wireless triangulation system, or the like. Upon determining that the vehicle system is located at or approaching a first designated location, the vehicle controller can automatically implement control settings designated by the movement plan for the first designated location such that the vehicle system travels according to the movement plan. The weight profile and/or weight values calculated based on the weight profile may be used to generate the movement plan and/or to update or revise a pre-existing movement plan. In a non-limiting example, the movement plan may designate a location along the route at which to apply the brakes based on an estimated stopping distance calculated using the total weight of the vehicle system as an input variable. Upon reaching that location, as determined using the location sensor, the vehicle controller generates a control signal that triggers the activation of the brakes.

In an embodiment, the weight profile can be used to validate or update stored weight-related values relating to the vehicle system. For example, in response to calculating the weight of an individual vehicle of the vehicle system based on the weight profile, that measured weight value can be comparted to a predefined or approximated weight value of that vehicle to determine a deviation between the measured weight and the predefined weight value. The predefined weight value may be designated by the manufacturer of the vehicle, a carrier that operates the vehicle, or the like. The predefined weight value could be a generic weight that is stored in a database and based on a similar type of vehicle. In a non-limiting example, if the deviation between the measured weight and the predefined weight is less than a designated threshold (e.g., 1%, 2%, 5%, or the like of the predefined weight value), then the vehicle controller and/or the off-board control system may validate the predefined weight value. Optionally, in response to determining a deviation, the predefined weight value may be replaced by the measured weight value in a database. The measured weight value can be access from the database and utilized for future movement modeling calculations for the vehicle system.

Optionally, the weight calculations based on the weight profile can also be utilized in non-movement-related calculations that are dependent on weight, such as calculations relating to the amount and/or type of cargo carried by the vehicle system.

Figure 5:
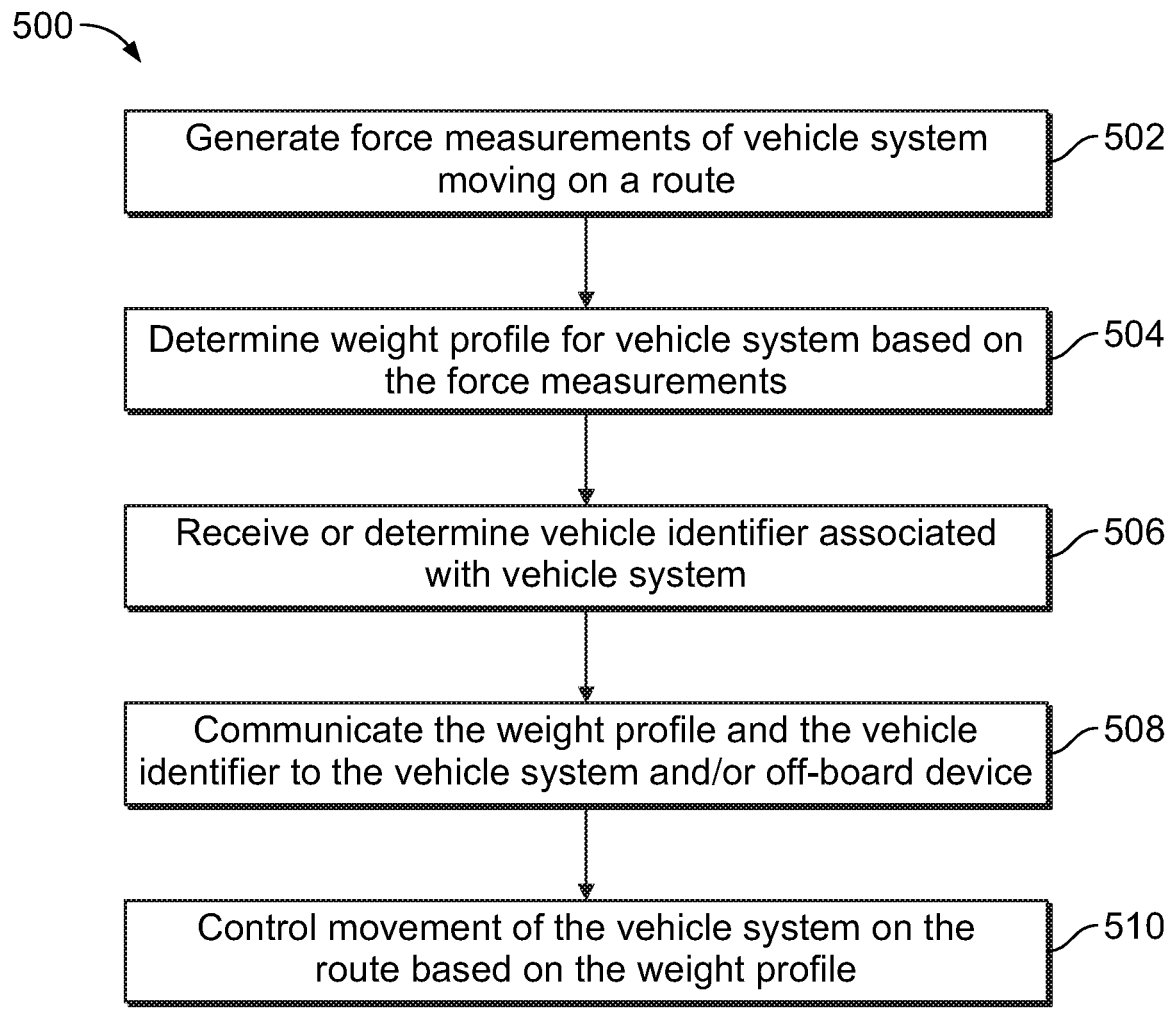
FIG. 5 illustrates a flowchart of one example of a method for determining a weight profile of a vehicle system.

FIG. 5 illustrates a flowchart of one example of a method 500 for determining a weight profile of a vehicle system. The method can represent operations performed by the weight profile determination system 100, which can include the wayside component assembly 106, the off-board device or control system 120, and/or the vehicle system 112. At 502, a plurality of force measurements of a vehicle system moving on a route are generated. The force measurements are obtained at different times and correspond to different locations along a length of the vehicle system. The force measurements may be generated by a force sensor, such as a weight scale, a piezoelectric sensor, a pressure sensor, a load cell (e.g., a strain gauge), or the like. The force sensor may be a component of a stationary wayside assembly, and the vehicle system moves relative to the force sensor.

At 504, a weight profile for the vehicle system is determined based on the force measurements that are generated. The weight profile represents a distribution of weight along the length of the vehicle system. The weight profile can be determined by aggregating the force measurements attributable to the vehicle system. Optionally, additional properties are calculated based on the weight profile, such as a total weight of the vehicle system and/or a respective weight of a particular segment of the vehicle system. The segment may represent a discrete vehicle of multiple vehicles that define the vehicle system, such as a discrete rail car of a train or a discrete truck in a convoy or consist of trucks traveling together with coordinated movements. The wayside assembly can generate the weight profile.

Optionally, at 506, a unique vehicle identifier of the vehicle system is received or determined. The vehicle identifier is associated and/or linked to the weight profile for attributing the weight profile to the correct vehicle system. The vehicle identifier may be received in a message from the vehicle system as the vehicle system approaches the force sensor. Alternatively, the vehicle identifier may be determined based on sensor data, such as a camera that generates image data of the vehicle system passing the force sensor or a reader device that scans for a computer-readable code on an outer surface of the vehicle system.

At 508, the weight profile is communicated to one or more of the vehicle system or an off-board device. The weight profile can be wirelessly communicated from the wayside assembly. At 510, movement of the vehicle system is controlled based on the weight profile. For example, the weight profile can be input into weight-dependent algorithms or formulas for determining movement characteristics of the vehicle system, such as braking characteristics, acceleration characteristics, and/or friction characteristics. The vehicle system can be controlled based on the movement characteristics. For example, the movement characteristics can be incorporated into a movement plan that designates tractive and/or brake settings for the vehicle system, such that the vehicle system is controlled according to the movement plan. More specifically, the braking characteristics can refer to a stopping distance of the vehicle system, and the weight profile can be used to determine a predicted stopping distance of the vehicle system based on a speed of the vehicle system. A vehicle controller can determine which control steps to take, and at what times or locations along the route, based on the weight profile. For example, the vehicle controller can determine the time or location at which to activate the brakes of the vehicle system according to the stopping distance calculated using the weight profile to determine a total weight of the vehicle system.

In one embodiment, a weight profile determination system is provided that includes a sensor and a controller. The sensor is disposed along a route and configured to generate a plurality of force measurements of a vehicle system moving on the route relative to the sensor. The force measurements are obtained at different times and correspond to different locations along a length of the vehicle system. The controller is configured to determine a weight profile for the vehicle system based on the force measurements generated by the sensor. The weight profile represents a distribution of weight along the length of the vehicle system. The controller is configured to communicate the weight profile to one or more of the vehicle system or an offboard device for controlling movement of the vehicle system based on the weight profile.

Optionally, the controller is configured to determine a total weight of the vehicle system based on the weight profile.

Optionally, the system further includes the vehicle system and/or the offboard device. The vehicle system and/or the offboard device is configured to use the weight profile to determine movement characteristics of the vehicle system, such as brake characteristics, acceleration characteristics, and/or friction characteristics.

Optionally, the controller is configured to communicate the weight profile to a positive control system onboard the vehicle system. The positive control system is configured to require receipt of a permission signal prior to allowing movement of the vehicle system along the route.

Optionally, the sensor is a weight scale, a pressure sensor, or a piezoelectric sensor.

Optionally, the vehicle system includes multiple vehicles, and the weight profile represents the combined weight of the multiple vehicles. Optionally, the multiple vehicles of the vehicle system are road vehicles that travel on the route with coordinated movements and are mechanically separate from each other.

Optionally, the vehicle system includes multiple vehicles and the controller is configured to determine a respective weight of one vehicle of the multiple vehicles based on the weight profile and at least one of the length of the vehicle system or a speed of the vehicle system traversing the sensor. Optionally, the controller is configured to determine a deviation between the respective weight of the one vehicle that is determined and a predefined weight value for the one vehicle.

Optionally, the controller is configured to receive a unique vehicle identifier associated with the vehicle system as the vehicle system at least one of approaches or traverses the sensor. The controller is configured to associate the weight profile with the unique vehicle identifier.

Optionally, the controller is communicatively connected to one or more cameras configured to generate image data of the vehicle system as the vehicle system at least one of approaches or traverses the sensor. The controller configured to analyze the image data to determine a unique vehicle identifier associated with the vehicle system for associating the weight profile with the unique vehicle identifier.

In one embodiment, a method (e.g., for determining a weight profile of a vehicle system) includes generating a plurality of force measurements of a vehicle system moving on a route. The force measurements are obtained at different times and correspond to different locations along a length of the vehicle system. The method includes determining a weight profile for the vehicle system based on the force measurements that are generated. The weight profile represents a distribution of weight along the length of the vehicle system. The method also includes communicating the weight profile to one or more of the vehicle system or an offboard device for controlling movement of the vehicle system based on the weight profile.

Optionally, the method further includes determining a total weight of the vehicle system based on the weight profile.

Optionally, the method further includes using the weight profile to determine movement characteristics of the vehicle system. The movement characteristics include braking characteristics, acceleration characteristics, and/or friction characteristics.

Optionally, the vehicle system includes multiple vehicles and the method further comprises determining a respective weight of one vehicle of the multiple vehicles based on the weight profile and at least one of the length of the vehicle system or a speed of the vehicle system. Optionally, the method further includes determining a deviation between the respective weight of the one vehicle that is determined and a predefined weight value for the one vehicle.

Optionally, the method further includes using the weight profile to determine a magnitude of braking effort and/or a location along the route at which to initiate the braking effort to enable the vehicle system to achieve a designated speed upon reaching a designated location along the route.

Optionally, the method further includes using the weight profile to determine a predicted stopping distance of the vehicle system based on a speed of the vehicle system.

Optionally, the method further includes receiving or determining a unique vehicle identifier associated with the vehicle system and associating the weight profile with the unique vehicle identifier within one or more of a message or a database.

In one embodiment, a system (e.g., a weight profile determination system) includes a sensor, a controller, and a vehicle control system. The sensor is disposed along a route and configured to generate a plurality of force measurements of a vehicle system moving on the route relative to the sensor. The force measurements are obtained at different times and correspond to different locations along a length of the vehicle system. The controller is configured to determine a weight profile for the vehicle system based on the force measurements generated by the sensor. The weight profile represents a distribution of weight along the length of the vehicle system. The vehicle control system is onboard the vehicle system and is configured to receive the weight profile determined by the controller and to use the weight profile to determine movement characteristics of the vehicle system including one or more of brake characteristics, acceleration characteristics, or friction characteristics.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a sensor disposed along a route and configured to generate a plurality of force measurements of a vehicle system moving on the route relative to the sensor, wherein the force measurements are obtained at different times and correspond to different locations along a length of the vehicle system; and
a controller configured to determine a weight profile for the vehicle system based on the force measurements generated by the sensor, the weight profile representing a distribution of weight along the length of the vehicle system, the controller configured to communicate the weight profile to one or more of the vehicle system or an offboard device for controlling movement of the vehicle system based on the weight profile.

2. The system of claim 1, wherein the controller is configured to determine a total weight of the vehicle system based on the weight profile.

3. The system of claim 1, further comprising the one or more of the vehicle system or the offboard device, wherein the one or more of the vehicle system or the offboard device is configured to use the weight profile to determine movement characteristics of the vehicle system, the movement characteristics including one or more of brake characteristics, acceleration characteristics, or friction characteristics.

4. The system of claim 1, wherein the controller is configured to communicate the weight profile to a positive control system onboard the vehicle system, the positive control system configured to require receipt of a permission signal prior to allowing movement of the vehicle system along the route.

5. The system of claim 1, wherein the sensor is a weight scale, a pressure sensor, or a piezoelectric sensor.

6. The system of claim 1, wherein the vehicle system includes multiple vehicles and the weigh profile represents the combined weight of the multiple vehicles.

7. The system of claim 6, wherein the multiple vehicles of the vehicle system are road vehicles that travel on the route with coordinated movements and are mechanically separate from each other.

8. The system of claim 1, wherein the vehicle system includes multiple vehicles and the controller is configured to determine a respective weight of one vehicle of the multiple vehicles based on the weight profile and at least one of the length of the vehicle system or a speed of the vehicle system traversing the sensor.

9. The system of claim 8, wherein the controller is configured to determine a deviation between the respective weight of the one vehicle that is determined and a predefined weight value for the one vehicle.

10. The system of claim 1, wherein the controller is configured to receive a unique vehicle identifier associated with the vehicle system as the vehicle system at least one of approaches or traverses the sensor, the controller configured to associate the weight profile with the unique vehicle identifier.

11. The system of claim 1, wherein the controller is communicatively connected to one or more cameras configured to generate image data of the vehicle system as the vehicle system at least one of approaches or traverses the sensor, the controller configured to analyze the image data to determine a unique vehicle identifier associated with the vehicle system for associating the weight profile with the unique vehicle identifier.

12. A method comprising:
generating a plurality of force measurements of a vehicle system moving on a route, wherein the force measurements are obtained at different times and correspond to different locations along a length of the vehicle system;
determining a weight profile for the vehicle system based on the force measurements that are generated, the weight profile representing a distribution of weight along the length of the vehicle system; and
communicating the weight profile to one or more of the vehicle system or an offboard device for controlling movement of the vehicle system based on the weight profile.

13. The method of claim 12, further comprising determining a total weight of the vehicle system based on the weight profile.

14. The method of claim 12, further comprising using the weight profile to determine movement characteristics of the vehicle system, the movement characteristics including one or more of braking characteristics, acceleration characteristics, or friction characteristics.

15. The method of claim 12, wherein the vehicle system includes multiple vehicles and the method further comprises determining a respective weight of one vehicle of the multiple vehicles based on the weight profile and at least one of the length of the vehicle system or a speed of the vehicle system.

16. The method of claim 15, further comprising determining a deviation between the respective weight of the one vehicle that is determined and a predefined weight value for the one vehicle.

17. The method of claim 12, further comprising using the weight profile to determine one or more of a magnitude of braking effort or a location along the route at which to initiate the braking effort to enable the vehicle system to achieve a designated speed upon reaching a designated location along the route.

18. The method of claim 12, further comprising using the weight profile to determine a predicted stopping distance of the vehicle system based on a speed of the vehicle system.

19. The method of claim 12, further comprising:
receiving or determining a unique vehicle identifier associated with the vehicle system; and
associating the weight profile with the unique vehicle identifier within one or more of a message or a database.

20. A system comprising:
a sensor disposed along a route and configured to generate a plurality of force measurements of a vehicle system moving on the route relative to the sensor, wherein the force measurements are obtained at different times and correspond to different locations along a length of the vehicle system;

a controller configured to determine a weight profile for the vehicle system based on the force measurements generated by the sensor, the weight profile representing a distribution of weight along the length of the vehicle system; and a vehicle control system onboard the vehicle system, wherein the vehicle control system is configured to receive the weight profile determined by the controller and to use the weight profile to determine movement characteristics of the vehicle system including one or more of brake characteristics, acceleration characteristics, or friction characteristics.

* * * * *